United States Patent Office 3,338,979
Patented Aug. 29, 1967

3,338,979
PERFLUOROCUMENE
Everett E. Gilbert, Morris Township, Morris County, N.J., and Basil S. Farah, West Seneca, N.Y., assignors to Allied Chemical Corporation, New York, N.Y., a corporation of New York
No Drawing. Filed July 26, 1965, Ser. No. 474,970
1 Claim. (Cl. 260—651)

This invention relates to a new compound, perfluorocumene, its preparation and to use thereof as a fumigant. As is known in the art, the control of pests which infest hosts such as soil, grain, fruits, vegetables, textiles, dwellings, warehouses and the like is extremely difficult in those cases where the pests penetrate deeply into the interior of the host space. Use of surface poisons or pesticides for this purpose is not completely effective because of the difficulty in reaching the interior of the space. Although various fumigants have been proposed for controlling such pests, there is a need for new and effective fumigants.

We have now discovered that perfluorocumene, a new compound, is an outstanding fumigant exerting extremely lethal effects against common penetrating pests such as those infesting plants, plant parts, grain, flour, carpets, etc.

Perfluorocumene, a colorless and slowly volatile liquid having a boiling point of 133–135° C., may be represented by the following formula:

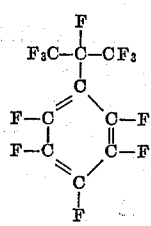

Perfluorocumene may be prepared by the reaction of 2-(pentafluorophenyl)hexafluoroisopropanol with sulfur tetrafluoride. The reaction occurring may be represented by the following equation:

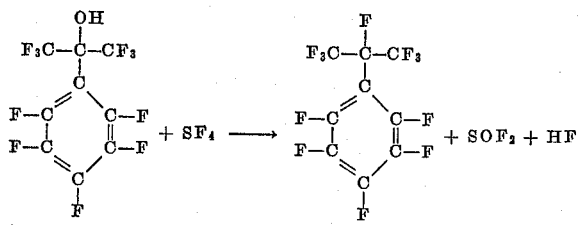

2-(pentafluorophenyl)hexafluoroisopropanol may be prepared by the reaction of pentafluorophenyl magnesium bromide with hexafluoroacetone, followed by hydrolysis of the reaction product, as disclosed and claimed in our copending application Ser. No. 475,005, filed of even date.

Sulfur tetrafluoride can be prepared by methods described, for example, by Brown and Robinson, J. Chem. Soc., 1955, 3147–51.

In general, perfluorocumene is prepared by reacting 2-(pentafluorophenyl) hexafluoroisopropanol with sulfur tetrafluoride, preferably in an oxygen-free atmosphere. Conventionally the air in the reaction vessel employed may be removed by evacuation or replaced by an inert gas such as nitrogen before the sulfur tetrafluoride is charged into the vessel.

Usually the temperature selected ranges from about 0° C. to 200° C. In the preferred embodiment of our invention, temperatures of about 100° C. to 150° C. are employed. The contact time may vary from a few minutes to a day or longer.

Reaction pressures are not critical. Generally the process is carried out under autogenous pressure; however, subatmospheric, atmospheric and superatmospheric pressure can be employed, if desired.

The mol ratio of sulfur tetrafluoride to 2-(pentafluorophenyl) hexafluoroisopropanol is preferably at least 1:1; however, the reaction proceeds when ratios above or below 1:1 are employed. Excess sulfur tetrafluoride amounting to a mol ratio as high as 2:1 and higher are suitable; ratios under 1:1 are less economical.

Isolation and purification of the perfluorocumene can be accomplished by conventional procedures. Since perfluorocumene is a liquid, it may be recovered by simple distillation of the reaction mixture.

The following examples, in which parts are by weight, illustrate preparation of perfluorocumene.

Example 1

66.8 parts of 2-(pentafluorophenyl)hexafluoroisopropanol and 43.2 parts of sulfur tetrafluoride were heated in an autoclave at 120° C. for 16 hours. The reaction mixture was washed with water and then distilled. A yield of 28.5 parts of perfluorocumene was obtained.

The product, a colorless liquid, had a boiling point of 133–135° C. and exhibited a surface tension of 23.8 dynes per cm.$^2$.

Example 2

The procedure of Example 1 was repeated using 100 parts of 2-(pentafluorophenyl)hexafluoroisopropanol and 50 parts of sulfur tetrafluoride, while heating at 125° C. for 16 hours. A yield of 93 parts of perfluorocumene was obtained.

The product had a boiling point of 134° C. Elemental analysis of the product gave the following results:

|  | Carbon | Hydrogen | Fluorine |
|---|---|---|---|
| Calculated, percent | 32.1 | 0 | 67.9 |
| Found, percent | 32.6 | *Trace | *67.3 |

* By nuclear magnetic resonance.

Example 3

33.6 parts of 2-(pentafluorophenyl)hexafluoroisopropanol and 20 parts of sulfur tetrafluoride were mixed in a glass pressure reactor at Dry Ice temperature. The reactor was sealed and allowed to return to room temperature. An exothermic reaction occurred, resulting in heat evolution and a rise in pressure, which was maintained at 400 p.s.i. by appropriate venting. Upon distillation of the reaction mixture, 28 parts of perfluorocumene were obtained.

The infrared spectrum of perfluorocumene, produced as described above, exhibited CF$_3$ group absorption at 8.0 and 8.7 microns, aromatic ring absorption at 6.05 microns and no hydroxyl absorption.

In use of perfluorocumene as a fumigant, pests are subjected to an atmosphere comprising a lethal concentration of the perfluorocumene. This involves contacting the pests with the vapor of perfluorocumene in the enclosure in which the pests exist.

Perfluorocumene is particularly applicable for combatting pest infestation in flour, grain and other stored products, whether contained in storage bins, grain elevators and the like, and in combatting plant pests. Perfluorocumene is also effective for control of other pests such as mites, flies, roaches, etc.

The pests are subjected to a toxic concentration of perfluorocumene according to well-established methods known in the art. According to a typical method, the toxicant is introduced into the enclosure in which the pests exist in such manner that it is free to volatilize and permeate the atmosphere.

In general, a dosage of 1.5 to 6 pounds of the toxicant per 1000 cubic feet of enclosed space are sufficient to saturate the area and to insure effective control of the pests. The exposure time required depends on the size of the enclosed area and the type of host, e.g. flour or grain, in the area. In an area of 1000 cubic feet, the time generally required for most effective fumigation is from about 8 to about 24 hours. In larger areas, such as grain elevators, desirable fumigation times may be about 24 to 36 hours.

The fumigation may be carried out, for example, by placing the toxicant in an open container or shallow tray in close contact with the atmosphere surrounding the pests under conditions which allow for vaporization of the toxicant.

If desired, the toxicant can be supplied in the form of a spray employing solutions or emulsions of the toxicant in organic solvents and/or in water. Carbon tetrachloride, perchloroethylene, chloroform and deodorized oils such as kerosene, xylene and methylated naphthalenes may be used as solvents.

Further, fogging may be employed if rapid dispersion of the toxicant into the atmosphere is desired. For example, deodorized kerosene containing the desired quantity of toxicant may be fogged into a warehouse from one or more points. Volatilization of the toxicant occurs in the air permitting a rapid build-up of vapor which is dispersed relatively evenly throughout the free air space in the warehouse.

In treating grain or flour, the toxicant may simply be poured or sprayed over the grain or flour where it is contained in the enclosure, such as storage warehouses, bins, elevators and the like, and allowed to vaporize and to remain in the enclosed space until it has substantially completely volatilized or permeated the space. Since the vapor is heavier than air, it tends to sink to the bottom of the enclosure and penetrate the grain or flour as it settles, killing the pests.

The effectiveness of perfluorocumene as a fumigant is illustrated by the following tests. Fumigant tests were run against four important common pests: confused flour beetle larvae, lesser mealworm larvae, black carpet beetle larvae and yellow mealworm larvae. All tests were run under substantially identical conditions. In carrying out these tests, tins having perforated lids and containing the insects and small amounts of appropriate food such as grain or flour are placed in a gallon Mason jar. The toxicant is pipetted onto absorbent cellulose placed in the jar in quantity to give the desired concentration of vapor in the jar. The jar is then sealed. After about 24 hours exposure, the insect containers are removed and mortality counts are made one day later. The results of the tests are set forth below:

|  | Dose 1,000 cu. ft.) | Percent Mortality | | | |
| --- | --- | --- | --- | --- | --- |
|  |  | CFBL | LML | BCBL | YML |
| Perfluorocumene | 2.75 | 100 | 100 | 80 | 100 |
| Control |  | 0 | 0 | 0 | 0 |

CFBL—confused flour beetle larvae.
LML—lesser mealworm larvae.
BCBL—Black carpet beetle larvae.
YML—yellow mealworm larvae.

Since various changes and modifications may be made in our invention without departing from the scope thereof, the invention is deemed to be limited only by the scope of the appended claim.

We claim:
Perfluorocumene.

References Cited
UNITED STATES PATENTS 2,859,245 11/1958 Smith _____ 260—651 X
3,236,894 2/1966 England _____ 260—651 X LEON ZITVER, *Primary Examiner.*

N. J. KING, *Assistant Examiner.*